May 10, 1966  H. DECKER  3,250,368
LINE-SPACING WHEEL AND CLUTCH FOR A TYPEWRITER
Filed Jan. 27, 1964  2 Sheets-Sheet 1

INVENTOR.
Herbert Decker
BY Michael S. Striker
Attorney

INVENTOR.
Herbert Decker
BY Michael S. Striker
Attorney 3,250,368
LINE-SPACING WHEEL AND CLUTCH FOR A TYPEWRITER
Herbert Decker, Nurnberg, Germany, assignor to Max Grundig, Furth, Bavaria, Germany
Filed Jan. 27, 1964, Ser. No. 340,477
Claims priority, application Germany, Jan. 29, 1963, G 36,924
13 Claims. (Cl. 197—123)

The present invention relates to a coupling arrangement, and more particularly to a coupling arrangement for connecting a line-spacing wheel with the platen of a typewriter so that the platen turns stepwise only in the coupled position of the device.

Coupling devices serving this purpose are provided in all conventional typewriters, and it is the principal object of the invention to provide an improved coupling arrangement for this purpose consisting of very few parts and permitting easy assembly so that the manufacturing cost is reduced but the device nevertheless operates absolutely reliably, and has a long span of life.

Another object of the invention is to provide a coupling device which can be attached by single attaching means, such as a screw, to standard parts of a typewriter.

Another object of the invention is to provide a coupling arrangement of extremely simple construction for connecting a tubular member with an end member which are connected to each other for relative turning movement.

With these objects in view, one embodiment of the present invention comprises a tubular member and an end member connected to each other for relative turning movement about the axis of the tubular member; a coupling means located in the tubular member and being resiliently deformable for coupling the two members to each other; a pair of actuating members for moving the coupling means to and from the coupling position; and operating means mounted on the end member axially shiftable for operating the actuating members.

In the preferred embodiment of the invention, a coupling means has a substantially ring-shaped portion including a pair of part-circular resilient leg portions having ends spaced from each other, and a center portion secured to the end member. The resilient leg portions have a normal position spaced from the inner surface of a tubular platen and a resiliently deformed spred coupling position frictionally engaging the platen of a typewriter.

The actuating members have first portion located between the ends of the leg portions and second portions mounted in cutouts of the center portion of the coupling means. The second portions have projections between which a conical portion of the operating means is located so that shifting of the conical portion by a shaft projecting out of the platen and having a knob, will result in coupling of the line-spacing wheel of the end member with the platen, or in disengagement therefrom.

Preferably, parts of the actuating members are prevented from spreading apart so that the first portions of the actuating members are spread to assume an angular position for spreading the ends of the part-circular legs apart until the outer surfaces thereof frictionally engage the inner cylindrical surface of the platen.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
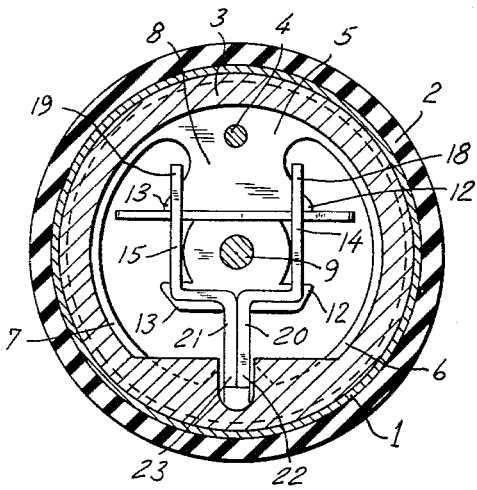
FIG. 3 is a cross sectional view showing the sectioned end of the device in the direction of the arrow III in FIG. 1.
Figure 4:
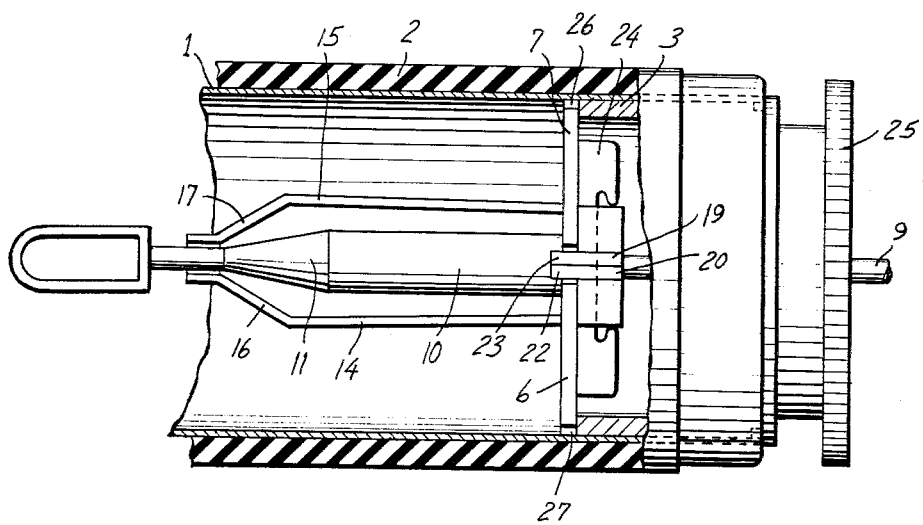
FIG. 4 is a fragmentary elevation, partially in longitudinal section illustrating a first operational position of the coupling arrangement.
Figure 5:
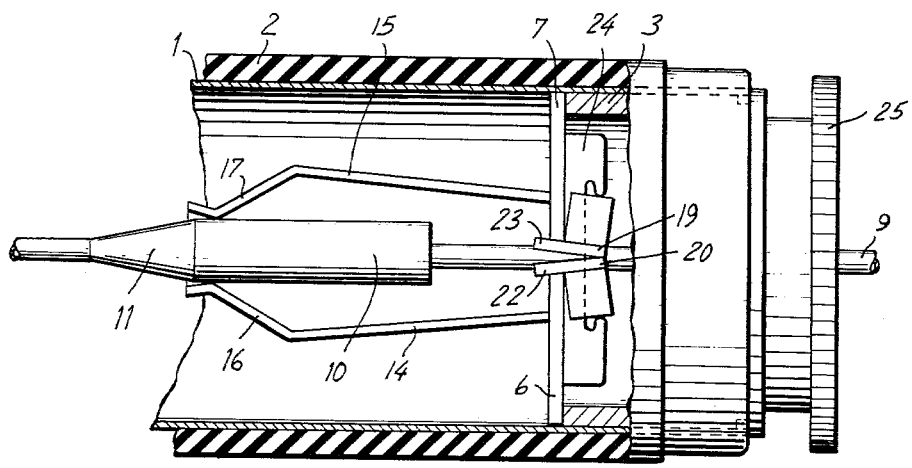
FIG. 5 is a view corresponding to FIG. 4 and illustrating another operational position of the coupling arrangement.

Referring now to the drawings, the platen of a typewriter includes the tubular member 1 and a tubular resilient cover 2 surrounding member 1. As best seen in FIGS. 3, 4 and 5, a tubular portion 3 of an end member which includes the line-spacing stepping wheel 25 is located within the end portion of tubular member 1 and mounted for turning movement about the longitudinal axis of tubular member 1. Member 3 is omitted in FIG. 1 for the sake of clarity.

Figure 2:
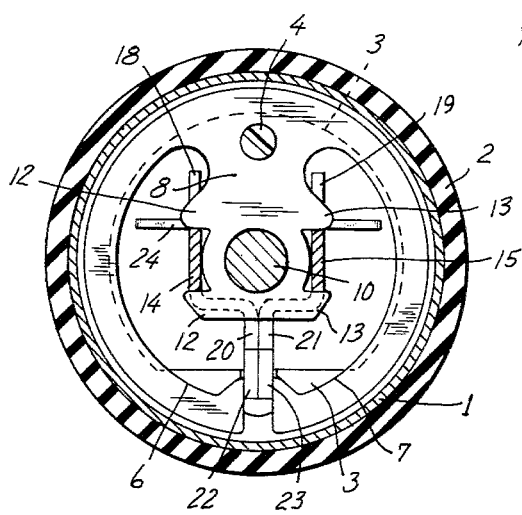
FIG. 2 is a cross sectional view taken on line II—II of FIG. 1.

A resilient coupling means 5 is secured by a single attaching screw 4 to a portion of member 3. The resilient coupling means 5 is substantially ring-shaped and has two part-circular leg portions 6 and 7 whose free ends are spaced from each other. A center portion 8 forms an integral part of coupling means 5 and extends to the axial region of the tubular platen 2, 1. Center portion 8 has two diametrically arranged cutouts, best seen in FIG. 2, which are bounded by pairs of projections 12 and 13. Center portion 8 has an axial bore in which a thin portion of a shaft 9 is located, as best seen in FIG. 3. Shaft 9 passes through a corresponding bore in end member 3 and projects from the line-spacing wheel 25 in axial direction, as shown in FIGS. 4 and 5, so that a manually operated knob, not shown, can be mounted on the thin shaft portion outside of the platen. Shaft 9 has a thicker portion 10 tapering at 11 to form a conical portion and terminating in a thinner end portion provided with a head, as best seen in FIG. 4.

A pair of actuating members includes a pair of first portions 22 and 23 located between the free ends of the part-circular resilient leg portions 6 and 7, a pair of transverse portions 20 and 21, a pair of second portions 14' and 15', which are further spaced from each other than portions 22 and 23 and include a pair of projections 18 and 19, and a pair of third portions 14 and 15 on the other side of the second portions 14' and 15' in relation to portions 22 and 23.

Figure 1:
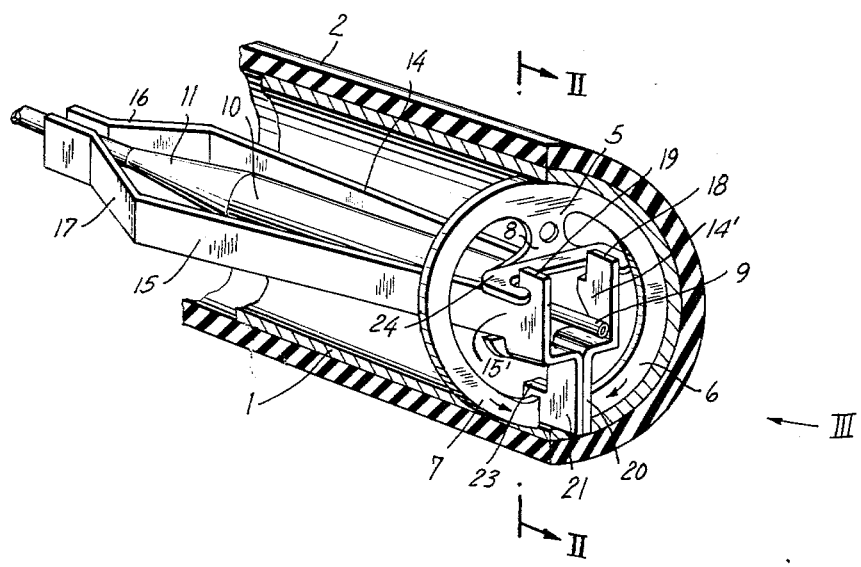
FIG. 1 is a fragmentary perspective view illustrating a coupling arrangement according to the present invention, and being partially shown in longitudinal section, and partially in transverse section.

Portions 14' and 15' are located in the axial region of the tubular platen on opposite sides of the thin shaft portion 9, and have elongated third portions 14 and 15 extending therefrom on opposite sides of shaft portion 10; third portions 14 and 15 having portions 16 and 17 inclined to each other and terminating in closely spaced end portions as best seen in FIG. 1.

When shaft 9 is shifted, shaft portion 10 and conical portion 11 move between the positions shown in FIG. 4 and FIG. 5, so that portions 14 and 15 are either in the normal position shown in FIG. 4, or in the spread position shown in FIG. 5.

The portions of the second portions 14' and 15' directly adjacent the third portions 14 and 15 are located in the cutouts of center portion 8 between projections 12 and 13. A U-shaped holding member 24 is located in the region of a shoulder formed between the projections 18 and 19 and the aforesaid portions of second portions 14' and 15', and has a pair of arms embracing projections 18 and 19, holding member 24 resting on the upper edges of the aforesaid portions of the second portions 14' and 15'. Holding member 24 prevents projections 18 and 19 from spreading apart when third portions 14 and 15 are spread apart by operation of the conical means 11. Therefore, portions 22 and 23 will assume an angularly spaced position when third portions 14 and 15 are spread apart in the position of FIG. 5.

In the operational position illustrated in FIGS. 1 to 4, the line-spacing wheel 25 is not coupled to platen 1, 2 since the legs 6 and 7 of the resilient coupling means 5 are normally in a position in which the outer edges thereof are spaced from the inner surface of tubular member 1, as shown at 26 and 27 in FIG. 4. Spaces 26 and 27 are somewhat exaggerated in FIG. 4, and a smaller distance is sufficient to assure a disengagement between the end member and the platen.

When the operation of a knob, not shown, shaft 9, 10 is shifted in axial direction in the region of the axis of the tubular platen, conical portion 11 spreads portions 16 and 17 apart until they abut the cylindrical shaft portion 10 so that the spread third portions 14 and 15 extend at a different angle to each other and turn portions 14', 15' together with portions 22, 23 to an angular spread position shown in FIG. 5, while the U-shaped holding member 24 engaging projections 18 and 19 prevents a detachment of portions 14' and 15' from the cutouts in the center portion 8. In the spread position of portions 22 and 23, the gap between the free ends of the resilient leg portions 6 and 7 is increased so that the outer circular edges of the leg portions 6 and 7 frictionally engage the inner surface of tubular member 1 whereby coupling means 5 is coupled to the tubular platen. Since coupling means 5 is secured by screw 4 to the inner portion 3 of the end member carrying the line-spacing wheel 25, the latter is coupled to the platen so that the same will perform a stepwise movement when turned by the operator by means which are of conventional nature and therefore not illustrated in the drawing.

It will be seen that the coupling arrangement of the invention comprises only few parts which are all connected to each other by resilient engagement, so that the entire coupling device can be easily assembled and mounted by a single screw on the end member 3, resulting in very little time required for assembly and manufacture and in reduction of the manufacturing cost as compared with conventional coupling arrangements serving the purpose of connecting the platen to line-spacing wheel.

It will be understood that each of the elements described above, or two or more together, may also find a useful application in other types of coupling arrangements differing from the types described above.

While the invention has been illustrated and described as embodied in a coupling arrangement for connecting a tubular platen with the line-spacing wheel of a typewriter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention, and therefore, such adaptations should and are intended to be comprehended within the meaning and range of equivalence of the following claims.

What is claimed as new and desired to be secured by Letters Patent is:

1. In a typewriter, in combination, a coupling arrangement comprising a tubular platen having an inner surface; an end member including a line-spacing stepping wheel and a part located in said tubular platen and mounting said end member for turning movement about the axis of said tubular platen; a coupling means located in said tubular platen and having a substantially ring-shaped portion including a pair of part-circular resilient leg portions having ends spaced from each other, and a center portion secured to said part of said end member, said resilient leg portions having a normal position spaced from the inner surface of said tubular platen and a resiliently deformed spread coupling position frictionally engaging the same, said center portion having two diametrically disposed cutouts; a pair of actuating members having first portions located between said ends of said leg portions, second portions mounted in said cutouts and having projections, and third portions located on the other side of said second portions in relation to said first portions; a U-shaped member having a pair of arms embracing said projections for preventing spreading of the same; and operating means mounted on said end member in the region of said axis axially shiftable between two positions and including means cooperating with said third portions of said actuating members for moving said first portions to a spread angularly spaced position in which said leg portions are resiliently deformed and spread to engage said tubular platen so that said tubular platen and said end member are coupled to each other.

2. A coupling arrangement as set forth in claim 1 wherein said second portion of each actuating member is in the form of a plate, wherein said first portion is a plate parallel to said plate and wherein each actuating member includes a plate portion connecting said plates and extending transversely to the same so that said second portions of said actuating members are more distant from each other than said first portions.

3. A coupling arrangement as set forth in claim 1 wherein said third portion of said actuating members are resilient and said actuating members resiliently engage said cutouts.

4. A coupling arrangement as set forth in claim 1 wherein said third portions and said projections extend at 90° to each other and form shoulders; and wherein said U-shaped member abuts said shoulders.

5. In a typewriter, in combination, a coupling arrangement comprising a tubular platen having an inner surface; an end member including a line-spacing stepping wheel and a part located in said tubular platen and mounting said end member for turning movement about the axis of said tubular platen; a coupling means located in said tubular platen and having a substantially ring-shaped portion including a pair of part-circular resilient leg portions having ends spaced from each other, and a center portion secured to said part of said end member, said resilient leg portions having a normal position spaced from the inner surface of said tubular platen and a resiliently deformed spread coupling position frictionally engaging the same, said center portion having two diametrically disposed cutouts; a pair of actuating members having first portions located between said ends of said leg portions, second portions mounted in said cutouts and having projections, and third portions located on the other side of said second portions in relation to said first portions; a U-shaped member having a pair of arms embracing said projections for preventing spreading of the same; and operating means mounted on said end member in the region of said axis axially shiftable between two positions and including means cooperating with said third portions of said actuating members for moving said first portions to a spread angularly spaced position in which said leg portions are resiliently deformed and spread to engage said tubular platen so that said tubular platen and said end member are coupled to each other.

6. In a typewriter, in combination, a coupling arrangement comprising a tubular platen having an inner surface; an end member including a line-spacing stepping wheel and a part located in said tubular platen and arranged for turning movement about the axis of said tubular platen; a coupling means located in said tubular platen and having a substantially ring-shaped portion including a pair of part-circular resilient leg portions having ends spaced from each other, and a center portion secured to said part of said end member, said resilient leg portions having a normal position spaced from the inner surface of said tubular platen and a resiliently deformed spread coupling position frictionally engaging the same, said center portion having oppositely arranged supporting portions; a pair of actuating members having first portions located between said ends of said leg portions, second portions mounted on said supporting portions of said center portion, and third portions located on the other side of said second portions in relation to said first portions; engaging means extending between and engaging both said actuating members in the region of said second portions thereof preventing the spreading of said second portions in said region in a direction away from each other; and operating means mounted on said end member in the region of said axis axially shiftable between two positions and including means cooperating with said third portions for tilting said actuating members about said supporting means supporting said second portions of said actuating members so as to move said first portions to a spread angularly spaced position in which said leg portions are resiliently deformed and spread to engage said tubular platen so that said tubular platen and said end member are coupled to each other.

7. The combination according to claim 6 wherein said center portion is formed with a pair of oppositely arranged cutouts constituting said supporting portions, said second portions of said actuating members being mounted in said cutouts.

8. A coupling arrangement as set forth in claim 6, wherein each of said pair of actuating members further comprises a transverse portion intermediate said first and second portions thereof and said transverse portions of said pair of actuating members being located adjacent each other, whereby in response to axial shifting of said operating means said pair of actuating members are caused to fulcrum against each other at said adjacent transverse portions thereof.

9. The combination according to claim 6, wherein said means engaging said actuating members in the region of said second portions thereof includes a pair of arms engaging said second portion for preventing spreading of the latter.

10. A coupling arrangement as set forth in claim 6, wherein said coupling means is connected to said end member with a single connecting member.

11. A coupling arrangement as set forth in claim 6, wherein said coupling means consists of a one-piece member.

12. The combination according to claim 6, wherein said operating means includes conical means located between and cooperating with said third portions of said actuating members.

13. A coupling arrangement as set forth in claim 12, wherein said operating means includes a shaft mounted on said end member for axial movement and projecting from said line-spacing stepping wheel so as to be adapted to be manually operated, said shaft having a thicker inner portion located between said third portions and having a tapered end forming said conical means.

References Cited by the Examiner

UNITED STATES PATENTS

| | | | |
|---|---|---|---|
| 784,368 | 3/1905 | Woodward | 197—123 |
| 923,016 | 5/1909 | Carhart | 197—123 |
| 1,148,167 | 7/1915 | Helmond | 197—123 |
| 1,259,677 | 3/1918 | Seib | 197—123 |
| 1,368,017 | 2/1921 | Briggs | 197—123 |
| 1,632,361 | 6/1927 | Armistead | 197—123 |
| 1,843,416 | 2/1932 | Dobson | 197—123 |
| 2,580,285 | 12/1951 | Dobson | 197—123 |
| 3,095,959 | 7/1963 | Toeppen | 197—123 |

FOREIGN PATENTS

| | | |
|---|---|---|
| 344,881 | 12/1921 | Germany. |
| 190,170 | 7/1937 | Switzerland. |

DAVID KLEIN, *Primary Examiner.*

ROBERT E. PULFREY, *Examiner.*

EDGAR S. BURR, *Assistant Examiner.*